United States Patent
Polderman

(10) Patent No.: US 6,468,335 B1
(45) Date of Patent: Oct. 22, 2002

(54) DEVICE FOR SEPARATING A MIXTURE OF FLUIDS

(75) Inventor: Hugo Gerardus Polderman, The Hague (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/547,755

(22) Filed: Apr. 12, 2000

(30) Foreign Application Priority Data

Apr. 12, 1999 (EP) .............................................. 99302818

(51) Int. Cl.⁷ .............................................. B01D 19/00
(52) U.S. Cl. .............................. 96/183; 96/182; 96/184; 95/253; 210/188
(58) Field of Search ......................... 96/156, 157, 158, 96/161, 164, 166, 169, 174, 182, 183, 184, 185, 186, 187; 55/342, 421, 466; 95/19, 241, 253, 254, 259, 260; 210/101, 120, 188, 539, 513, 800, 801

(56) References Cited

U.S. PATENT DOCUMENTS

| | | | |
|---|---|---|---|
| 2,664,170 A | * 12/1953 | Walker et al. ................. | 96/164 |
| 2,767,802 A | * 10/1956 | Orrell .......................... | 96/174 |
| 3,129,162 A | * 4/1964 | Jones .......................... | 210/101 |
| 3,581,471 A | * 6/1971 | Waterman ..................... | 96/185 |
| 4,604,196 A | * 8/1986 | Lowrie et al. ................. | 96/184 |
| 4,660,414 A | 4/1987 | Hatton et al. ............. | 73/61.1 R |
| 4,661,127 A | * 4/1987 | Huntley ........................ | 96/184 |
| 4,698,152 A | 10/1987 | Carroll ....................... | 210/96.1 |

FOREIGN PATENT DOCUMENTS

RU            2077364            6/1995

OTHER PUBLICATIONS

Foreign Search Report dated Jul. 17, 2000.

* cited by examiner

*Primary Examiner*—Duane Smith
*Assistant Examiner*—Jason M. Greene

(57) ABSTRACT

A device for separating a mixture of fluids having a feed inlet, a gas outlet, an outlet for the lighter liquid and an outlet for the heavier liquid, which device comprises a normally horizontal supply pipe with the feed inlet at its upstream end, an inclined pipe having a closed lower end, a gas discharge system communicating with the gas outlet, a discharge system for lighter liquid communicating with the outlet, and a discharge system for heavier liquid communicating with the outlet, wherein the diameter of the supply pipe is selected such that during normal operation the velocities of the liquids are below a pre-determined value, wherein the ratio of the length of the supply pipe to its diameter is larger than 10 , and wherein the slope of the inclined pipe is selected such that during normal operations a stratified flow is maintained in the inclined pipe.

7 Claims, 2 Drawing Sheets

DEVICE FOR SEPARATING A MIXTURE OF FLUIDS

FIELD OF THE INVENTION

The present invention relates to a device for separating a mixture of fluids, which mixture comprises gas, a lighter liquid and a heavier liquid, into the three phases, gas, lighter liquid and heavier liquid. Such a mixture of fluids is for example a mixture of gas, hydrocarbon oil and water that is produced from a subsurface reservoir.

BACKGROUND OF THE INVENTION

Russian patent publication No. 2 077 364 discloses a device for separating a mixture of fluids into three phases, gas, lighter liquid and heavier liquid, having a feed inlet, a gas outlet, an outlet for the lighter liquid and an outlet for the heavier liquid, which device comprises:

an upwardly inclined Supply pipe with the feed inlet at its upstream end;

a downwardly inclined pipe having an inlet at its upper end that is connected to the outlet of the supply pipe and having a closed lower end;

a gas discharge system having an inlet that is located in the gas-filled space and an outlet that is in fluid communication with the gas outlet of the device;

a discharge system for lighter liquid having an inlet that is located in the lighter liquid-filled space and an outlet that is in fluid communication with the outlet for lighter liquid of the device; and a discharge system for heavier liquid having an inlet arranged at the lower end of the downwardly inclined pipe and an outlet that is in fluid communication with the outlet for heavier liquid of the device.

During normal operation, a mixture of gas, lighter liquid and heavier liquid is supplied to the feed inlet of the separation device. The mixture passes upwards through the upwardly inclined supply pipe towards the inlet of the downwardly inclined pipe. In the upper end of the downwardly inclined pipe, gas is separated from the liquids that fall downwards towards the lower end of the downwardly inclined pipe. Gas, lighter liquid and heavier liquid are separately removed from the device via the respective outlets.

A disadvantage of the known separation device is that turbulence is generated in the upwardly inclined feed pipe and that counter current flow prevails in the downwardly inclined pipe, which phenomena adversely affect the separation efficiency of the device.

SUMMARY OF THE INVENTION

It is an object of the present invention to provide a device for separating a fluid mixture that has an improved separation efficiency, which separation device is specifically intended for fluid mixtures which have been transported in an upstream pipeline under such conditions that pre-separation has occurred so that the fluid mixtures arrive in the form of a stratified flow.

To this end the device for separating a mixture of fluids into three phases, gas, lighter liquid and heavier liquid, having a feed inlet, a gas outlet, an outlet for the lighter liquid and an outlet for the heavier liquid, according to the present invention comprises:

a normally horizontal supply pipe with the feed inlet at its upstream end;

an inclined pipe having an inlet at its upper end that is connected to the outlet of the supply pipe and having a closed lower end;

a gas discharge system comprising a gas riser having an inlet that is located in the gas-filled space and an outlet that is in fluid communication with the gas outlet of the device;

a discharge system for lighter liquid having an inlet that is located in the lighter liquid-filled space and an outlet that is in fluid communication with the outlet for lighter liquid of the device; and a discharge system for heavier liquid having an inlet arranged below the bottom level of the supply pipe and an outlet that is in fluid communication with the outlet for heavier liquid of the device, wherein the diameter of the supply pipe is selected such that during normal operation the velocities of the liquids are below a pre-determined value, wherein the ratio of the length of the supply pipe to its diameter is larger than 10, and wherein the slope of the inclined pipe is selected such that during normal operations a stratified flow is maintained in the inclined pipe.

DETAILED DESCRIPTION

Applicant had found that stratified flow in the supply conduit is maintained if the diameter of the supply pipe is selected such that during normal operation the velocities of the liquids are below a pre-determined value, and if the ratio of the length of the supply pipe to its diameter is larger than 10. Moreover wherein the slope of the inclined pipe can be selected such that during normal operations a stratified flow is maintained in the inclined pipe.

In the specification and in the claims, the expression 'gas-filled space' is used to refer to the space that is filled with gas during normal operation, and the term 'lighter liquid-filled space' is used to refer to the space that is filled with the lighter liquid during normal operation.

Figure 1:
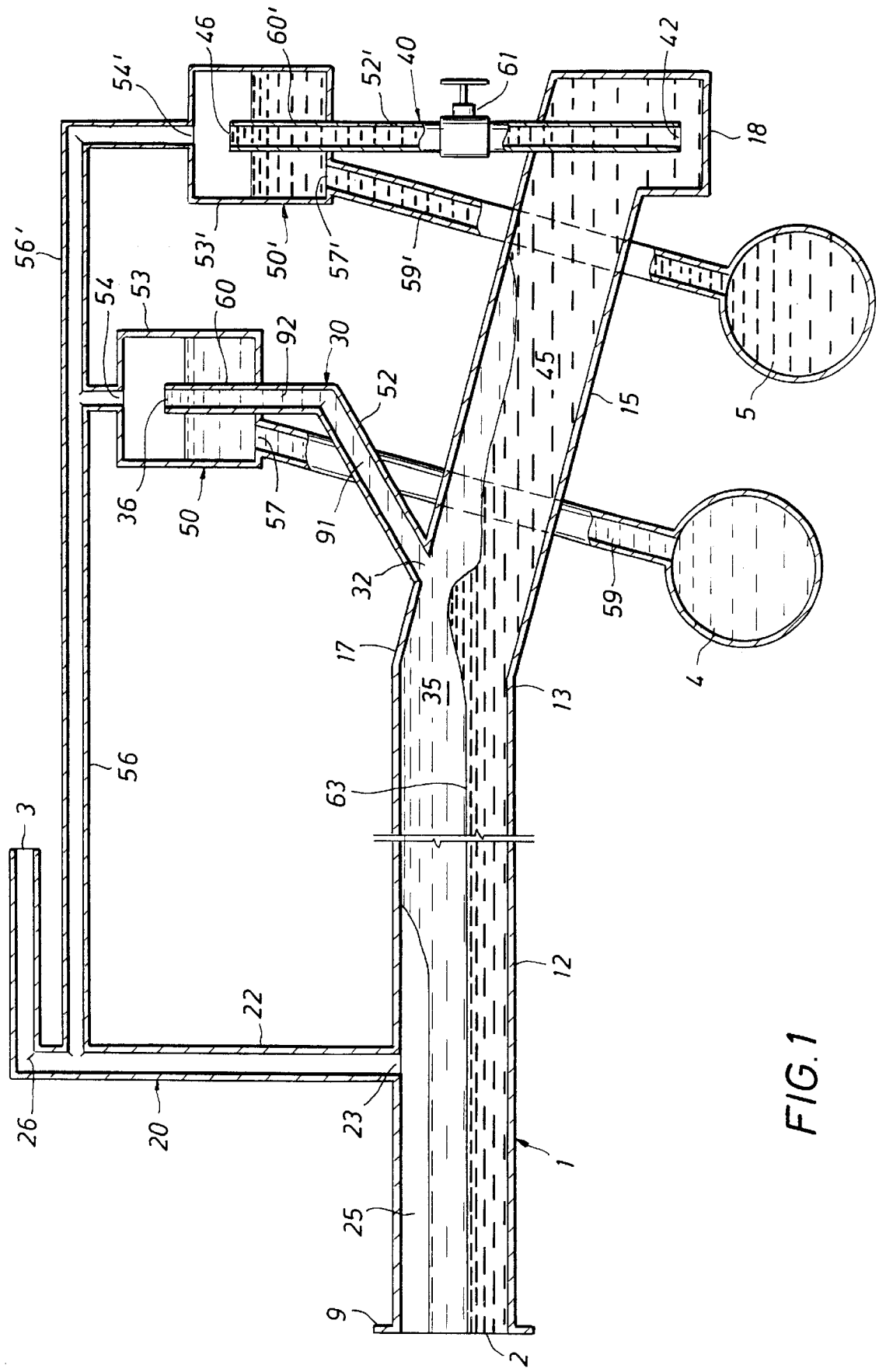
FIG. 1 shows schematically a first embodiment of the invention.

The invention will now be described by way of example in more detail with reference to the accompanying drawings. Referring to FIG. 1, the device 1 for separating a mixture of fluids into three phases, gas, lighter liquid and heavier liquid, has a feed inlet 2, a gas outlet 3, an outlet for the lighter liquid 4 and an outlet for the heavier liquid 5. The feed inlet 2 is provided with a flange 9 for connecting a pipeline (not shown) thereto.

The separation device 1 comprises a normally horizontal open-ended supply pipe 12 with the feed inlet 2 at its upstream end and having an outlet 13 at the opposite end, and an inclined pipe 15 having an inlet 17 at its upper end that is connected to the outlet 13 of the supply pipe 12 and having a closed lower end 18.

The separation device 1 further comprises a gas discharge system 20 comprising a gas riser 22 having an inlet 23 that is located in the gas-filled space 25 and an outlet 26 that is in fluid communication with the gas outlet 3 of the separation device 1. To enable removing the separated liquids, the separation device 1 comprises a discharge system 30 for lighter liquid having an inlet 32 that is located in the lighter liquid-filled space 35 and an outlet 36 that is in fluid communication with the outlet 4 for lighter liquid of the separation device 1, and a discharge system 40 for heavier liquid having an inlet 42 arranged in the heavier liquid-filled space 45 which is the space that is filled with the heavier liquid during normal operation, below the bottom level of the supply pipe 1 and an outlet 46 that is in fluid communication with the outlet 5 for heavier liquid of the separation device 1.

The diameter of the supply pipe 12 is selected such that during normal operation the velocity of the lighter liquid (oil) is below 0.05 m/s and that the velocity of the heavier liquid (water) is below 0.2 m/s. The ratio of the length of the supply pipe 12 to its diameter is larger than 10. In order to preserve the stratified flow in the inclined pipe 15, the downward slope is selected within a predetermined range, suitably between 1° and 3° from the horizontal plane.

During normal operation a feed comprising gas, lighter liquid and heavier liquid is passed from the pipeline (not shown) into the feed inlet 2 of the separation device 1. The flow regime in the separation device is stratified, so that gas fills the gas-filled space 25, lighter liquid the lighter liquid-filled space 35 and heavier liquid the heavier liquid-filled space 45. Gas is removed through the discharge system 20 for gas, lighter liquid through the discharge system 30 for lighter liquid and heavier liquid through the discharge system 40 for heavier liquid, and the fluids leave the separation device 1 separately through the outlets 3, 4 and 5.

Because the configuration of the open-ended supply pipe 12 and the inclined pipe 15 is selected such that stratified flow is preserved and further stabilized, the separation device 1 according to the present invention has an excellent separation efficiency.

Variations in the elevation of the interface 63 between the lighter and the heavier liquid that may occur during normal operation can be controlled by means of the means for controlling the relative volumetric flow rates of the liquids flowing through the outlet for heavier liquid and the outlet for lighter liquid. The discharge system 30 for the lighter liquid further comprises means 50 for controlling the volumetric flow rate in the outlet 4 for lighter liquid, and the discharge system 40 for the heavier liquid further comprises means 50' for controlling the volumetric flow rate in the outlet 5 for heavier liquid.

In the embodiment of the invention as shown in FIG. 1, the means 50 for controlling the volumetric flow rate in the outlet 4 for lighter liquid comprises a riser 52 and an overflow chamber 53. The overflow chamber 53 has a gas outlet 54 that is in fluid communication with the gas discharge system 20 by means of open-ended conduit 56, and a liquid outlet 57 that is in fluid communication with the outlet 4 for the lighter liquid of the separation device 1 by means of conduit 59. The inlet of the riser 52 is the inlet 32 of the discharge system 30 for lighter liquid, and the outlet end 60 of the riser 52 extends into the overflow chamber 53.

The means 50' for controlling the volumetric flow rate in the outlet 5 for heavier liquid comprises a riser 52' and an overflow chamber 53'. The overflow chamber 53' has a gas outlet 54' that is in fluid communication with the gas discharge system 20 by means of open-ended conduit 56', and a liquid outlet 57' that is in fluid communication with the outlet 5 for the heavier liquid of the separation device 1 by means of conduit 59'. The inlet of the riser 52' is the inlet 42 of the discharge system 40 for heavier liquid, and the outlet end 60'of the riser 52' extends into the overflow chamber 53'. Furthermore, the means 50' include a flow control valve 61 arranged in the riser 52'.

The relative elevation of the outlet ends 60 and 60' of the risers 52 and 52' and the pressure drop in the device and over the flow control valve 61 control the relative volumetric flow rates of the liquids flowing through the outlet for heavier liquid and the outlet for lighter liquid. However, the total volumetric flow rate is not affected. In this way the level of the interface can be selected, and variations thereof can be controlled. Applicant had found that when the volumetric flow rate of the heavier liquid (water) is relatively low, the heavier liquid is less contaminated with the lighter liquid (oil)

Suitably the inclined section 15 has a predetermined minimum length to diameter ratio of 15.

The riser 52 of the discharge system for lighter liquid 30 comprises inclined section 91 and a vertical section 92 connected to the outlet end of the inclined section 92, wherein the inclined section 91 is upwardly inclined with respect to the direction of fluid flow through the separation device 1 during normal operation.

Figure 2:
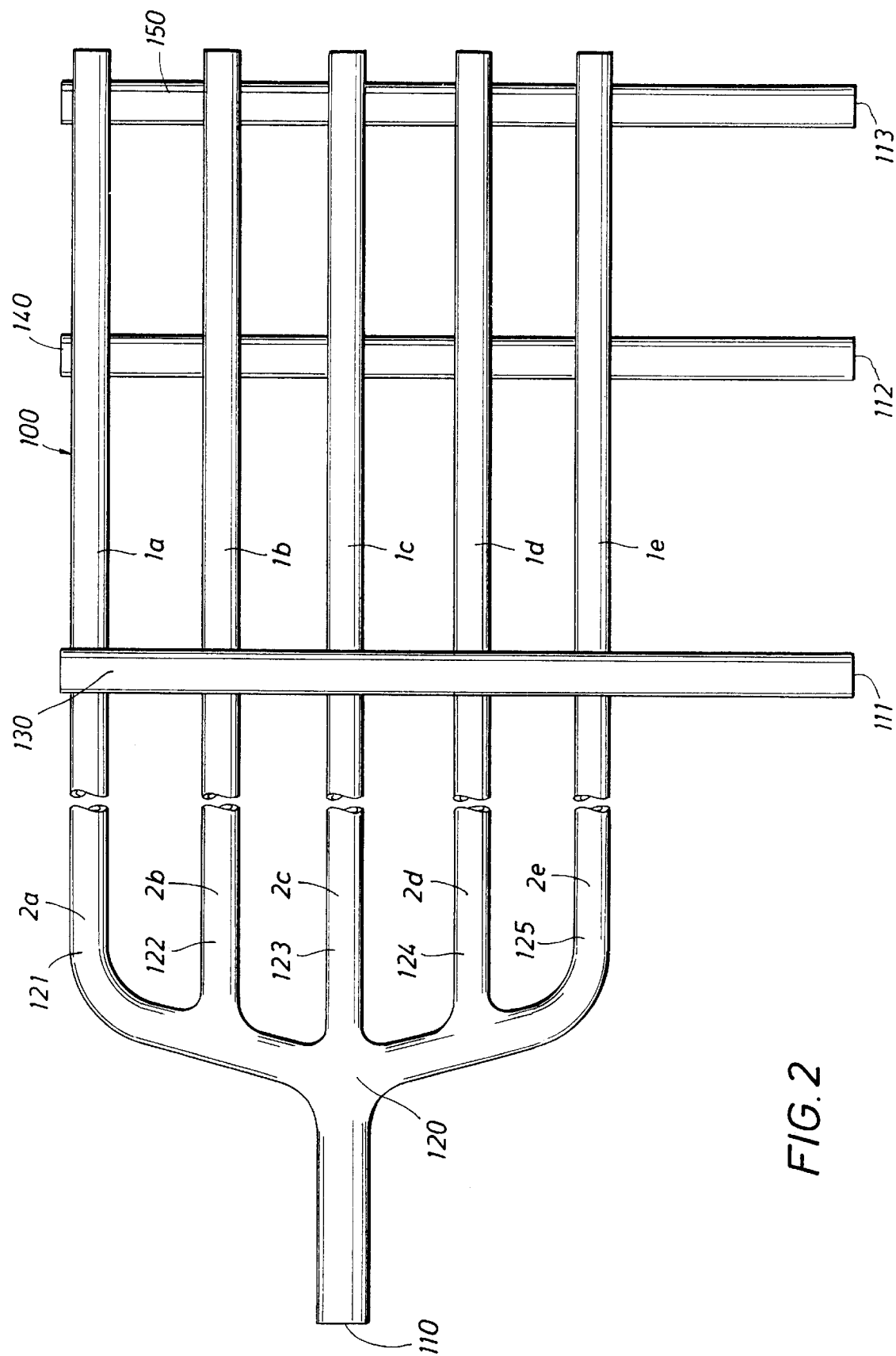
FIG. 2 shows schematically a second embodiment of the invention.

Reference is now made to FIG. 2 showing schematically a second embodiment of the present invention. This embodiment is an installation 100 with several separation devices 1a, 1b, 1c, 1d and 1e in parallel. The installation 100 for separating a mixture of fluids into three phases, gas, lighter liquid and heavier liquid, has an inlet 1 110 for the mixture of fluids, a gas outlet 111, an outlet 112 for the lighter liquid and an outlet 113 for the heavier liquid. The installation 100 comprises a flow distribution system 120 having at its upstream end the inlet 110 for the mixture of fluids and five outlets 121, 122, 123, 124 and 125, five separation devices 1a, 1b, 1c, 1d and 1e as described with reference to FIG. 1. The feed inlet 2a, 2b, 2c, 2d, or 2e of each device 1a, 1b, 1c, 1d or 1e is connected to one of the outlets 121, 122, 123, 124 or 125 of the flow distribution system 120.

The installation 100 further comprises a gas gathering system 130, which gas gathering system 130 has inlet (not shown) for each separation device 1a, 1b, 1c, 1d and 1e, which inlet is in fluid communication with the gas outlet (not shown) of the separation device, and has an outlet that is the gas outlet 111 of the installation 100. The installation also comprises a gathering system 140 for lighter liquid, having one inlet (not shown) for each device 1a, 1b, 1c, 1d and 1e, which inlet is in fluid communication with the outlet (not shown) for lighter liquid of the separation device, and has an outlet for lighter liquid that is the outlet 112 for lighter liquid of the installation 100. Furthermore the installation 10 0 comprises a gathering system 150 for heavier liquid having one inlet (not shown) for each separation device 1a, 1b, 1c, 1d and 1e, which inlet is in fluid communication with the outlet (not shown) for heavier liquid of the separation device, and has an outlet that is the outlet 113 for heavier liquid of the installation 100.

Suitably, the outlets 121, 122, 123, 124 and 125 can be the outlets of inclined pipes (not shown).

This embodiment is particularly suitable if large volumes have to be handled.

I claim:

1. A device for separating a mixture of fluids into three phases, gas, lighter liquid and heavier liquid, having a feed inlet, a gas outlet, an outlet for the lighter liquid and an outlet for the heavier liquid, which device comprises:

a supply pipe with the feed inlet at its upstream end, said supply pipe typically oriented in a horizontal position;

an inclined pipe having an inlet at its upper end that is connected to the outlet of the supply pipe and having a closed lower end;

a gas discharge system comprising a gas riser having an inlet that is located in a gas-filled space and an outlet that is in fluid communication with the gas outlet of the device;

a discharge system for lighter liquid having an inlet that is located in a lighter liquid-filled space and an outlet that is in fluid communication with the outlet for lighter liquid of the device;

a discharge system for heavier liquid having an inlet arranged below the bottom level of the supply pipe and an outlet that is in fluid communication with the outlet for heavier liquid of the device;

wherein the diameter of the supply pipe is selected such that during normal operation the velocities of the liquids are below a pre-determined value, wherein the ratio of the length of the supply pipe to its diameter is larger than 10 , and wherein the slope of the inclined pipe is selected such that during normal operations a stratified flow is maintained in the inclined pipe.

2. Device according to claim 1, wherein the discharge system of the heavier liquid, or the discharge system of the lighter liquid, or both discharge systems include(s) means for controlling the relative volumetric flow rates of the liquids flowing through the outlet for heavier liquid and the outlet for lighter liquid.

3. Device according to claim 2, wherein the means for controlling the relative volumetric flow rates comprises an overflow chamber having a gas outlet that is in fluid communication with the gas discharge system and a liquid outlet that is in fluid communication with the corresponding outlet for liquid of the device, and a riser of which the inlet is the inlet of the corresponding discharge system and of which the outlet end extends into the overflow chamber.

4. Device according to claim 3, wherein the riser further includes a flow control valve.

5. Device according to claim 1, wherein the discharge system for lighter liquid includes a riser, which riser has an inclined section and a vertical section connected to the outlet end of the inclined section, wherein the inclined section is upwardly inclined with respect to the direction of fluid flow through the device during normal operation.

6. Device according to claim 1, wherein the slope of the inclined pipe is between 1° and 3°.

7. An installation for separating a mixture of fluids into three phases, gas, lighter liquid and heavier liquid, having an inlet for the mixture of fluids, a gas outlet, an outlet for the lighter liquid and an outlet for the heavier liquid, the installation comprising:

a flow distribution system having at its upstream end the inlet for the mixture of fluids and at least two outlets;

at least two devices for separating a mixture of fluids into three phases, gas, lighter liquid and heavier liquid according to claim 1 arranged parallel to each other, wherein the feed inlet of each device is connected to one of the outlets of the flow distribution system;

a gas gathering system having one inlet for each device, which inlet is in fluid communication with the gas outlet of the device, and having an outlet that is in fluid communication with the gas outlet of the installation;

a gathering system for lighter liquid, having one inlet for each device, which inlet is in fluid communication with the outlet for lighter liquid of the device, and having an outlet for lighter liquid that is in fluid communication with the outlet for lighter liquid of the installation, and a gathering system for heavier liquid having one inlet for each device, which inlet is in fluid communication with the outlet for heavier liquid of the device and having an outlet that is in fluid communication with the outlet for heavier liquid of the installation.

* * * * *